Nov. 25, 1958   A. E. HOYLER   2,861,290
WINDSHIELD WIPER ATTACHMENT
Filed Aug. 21, 1956
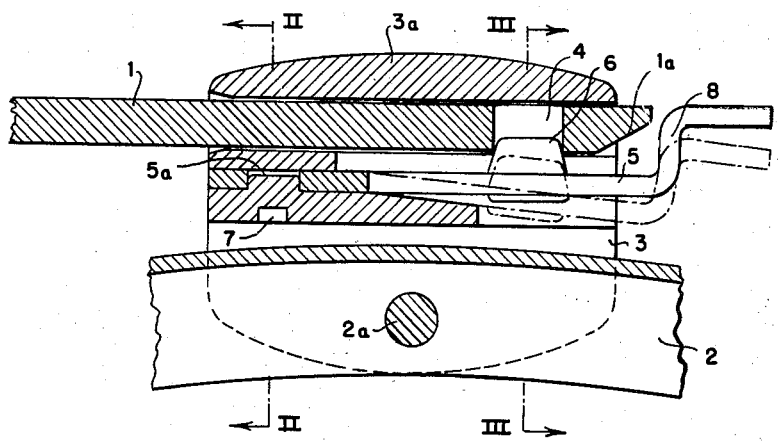
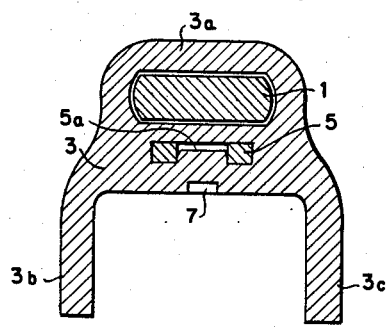
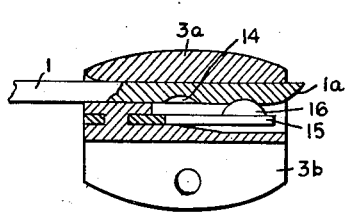
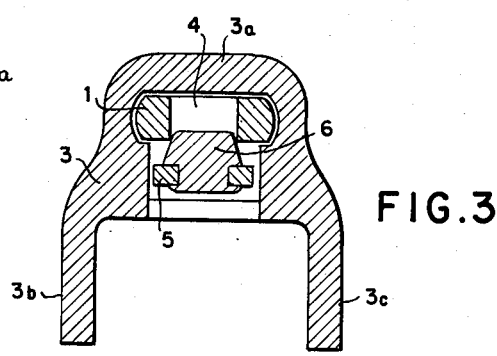

United States Patent Office 2,861,290
Patented Nov. 25, 1958

2,861,290

WINDSHIELD WIPER ATTACHMENT

Alfred Ernst Hoyler, Buhlertal, Baden, Germany, assignor to Avog Elektro- und Feinmechanik G. m. b. H., Buehlertal, Baden, Germany, a corporation of Germany Application August 21, 1956, Serial No. 605,347

Claims priority, application Germany August 27, 1955

2 Claims. (Cl. 15—250)

My invention relates to windshield wipers and, more specifically, to an attachment structure for securing the wiper blade to the wiper arm, particularly for use with relatively heavy wiper blades as employed for curved windshields of automotive vehicles.

The heretofore customary attaching devices leave much to be desired. For cheap manufacture, the individual components are mainly composed of riveted sheet metal parts which are apt to become loose after prolonged periods of use and then cause disagreeable rattling and noise. Besides, due to wear and lost motion between the individual components, the varnish coating or chrome plating of the wiper assembly may become damaged locally, thus spoiling the desired good appearance. Other known designs of such wiper structures, in which for instance the wiper arm is made of stainless steel, are provided with a hook-shaped attaching structure having the end of the wiper arm bent to U-shape and straddling a cross-pin of the wiper blade, a likewise U-shaped or hair-pin-shaped leaf spring being provided for pressing the arm and the blade against each other. The spring has projections entering into notches or embossments of the wiper arm for preventing the spring from dropping out of the assembly. Such a design requires careful and accurate manufacture if smallest possible lost motion is to be attained. In many cases both above-mentioned types of attaching devices are relatively complicated so that a layman, attempting to exchange a wiper blade, does not readily recognize the necessary manipulations and is tempted to apply excessive force, thus damaging the wiper components.

It is an object of my invention to eliminate the above-mentioned deficiencies and to provide a windshield wiper attaching structure which is not only simple in manufacture and of good appearance but also secures a rigid connection, free of lost motion, between the wiper arm and the wiper-blade holder.

The novel features of my invention by virtue of which the just-mentioned objectives are attained are set forth with particularity in the claims annexed hereto and will be fully apparent from the embodiment illustrated by way of example on the accompanying drawing and described below. On the drawing:

Fig. 1 is a longitudinal sectional view of a wiper attaching structure,

Fig. 2 is a cross-section taken along the line II—II indicated in Fig. 1;

Fig. 3 is a cross-section taken along the line III—III indicated in Fig. 1, and

Fig. 4 is a longitudinal sectional view of a modified structure.

In all illustrations the free end of a windshield-wiper arm is denoted by 1. It will be understood that the other end (not illustrated) of the wiper arm is pivoted for oscillating motion through an angular range as generally customary with windshield wipers of automotive vehicles. The wiper blade or blade assembly 2 is pivotally secured at 2a to a holder 3. The holder 3 comprises a sleeve-shaped portion 3a and two mutually spaced leg portions 3b and 3c, between which the blade assembly 2 is mounted. The wiper arm or end portion 1, consisting of a flat rod of stainless steel, passes through a guiding hole of sleeve member 3a which extends along the entire length of the holder 3 and has a flat cross-sectional shape so that the sleeve member 3a surrounds the arm 1 on all sides with a good sliding fit and slightest clearance.

The arm 1 is provided with a recess in one of its flat sides close to the end of the arm. In the embodiment of Figs. 1 to 3, the recess is formed by a cross bore 4. The end of arm 1 is somewhat tapered at the tip 1a in order to facilitate passing the guiding hole of sleeve member 3a over the tip when attaching or exchanging the holder and blade assembly.

Mounted in sleeve member 3a according to Figs. 1 to 3 is a leaf spring 5 which carries a slightly conical boss 6 that engages the bore 4 and locks the holder 3 against longitudinal displacement along the arm 1. The boss 6 may be riveted to the spring 5 as illustrated, or it may form an embossment or other integral portion of the leaf spring 5 itself. The leaf spring 5 is stuck into another guiding hole of the sleeve member 3a and is fastened to the sleeve member 3a by means of a projection which enters into a hole 5a of spring 5. The fastening projection is produced by pressing, at the location 7, some of the sleeve material, consisting of brass, zinc or aluminum, into the hole 5a after the leaf spring 5 is inserted. However, the leaf spring may also be joined with the holder 3 in any other suitable manner. For instance, when the holder 3 is produced by casting or injection molding, the spring 5 may be directly molded into the casting as is shown in Fig. 4.

In the embodiment of Figs. 1 to 3, the free end of leaf spring 5 protrudes out of the holder 3 and is bent to angular shape at 8, so that the bent portion forms a stop for the end 1a of the wiper arm 1. However, if desired, the protruding end of leaf spring 5 may be given straight shape, and the wiper arm 1 may be provided with several recesses or bores 4 so that the effective length of the wiper arm can be changed simply by shifting the blade holder 3 along the arm in order to place the boss 6 into latching engagement with a selected one of the bores 4. Instead of cross bores 4, the wiper arm may be provided with flat or lentil-shaped recesses as shown at 14 in Fig. 4. Then, an actuation of the latching spring 5 by hand is no longer required because the holder can be moved into proper latching position simply by applying sufficiently great force to the holder when passing it onto the end of the wiper arm. In such case the leaf spring, denoted by 15 in Fig. 4, need not be provided with an end portion protruding out of the holder 3. However, for the same purpose, the cross bore 4 (Figs. 1, 3) or bores may be used and the boss of the leaf spring 5 may be given a rounded shape as shown at 16 in Fig. 4, so that the boss will snap into the bore or bores when the blade-holder is forcefully displaced along the wiper arm.

Such and other modifications will be obvious to those skilled in the art upon a study of this disclosure, and it will be recognized that the invention may be embodied in devices somewhat differing from the one particularly illustrated and described, without departing from the essential features of my invention and within the scope of the claims annexed hereto.

I claim:

1. A windshield-wiper attaching structure, comprising a wiper arm of flat rod shape having a straight free end and having recess means in one of the flat sides of said end portion, a wiper-blade holder having a sleeve member and a bifurcated leg member integral with said sleeve member, said sleeve member having an opening which has a portion elongated in the longitudinal direction of said arm, said opening having along said elongated portion a flat cross-sectional shape closely mating that of said wiper-arm end so as to permit only longitudinal displacement of said arm while preventing angular edging and rotary motion of said arm relative to said sleeve member, and said sleeve member forming a wall between said opening and said leg member, a leaf spring member extending longitudinally of said sleeve opening and being mounted on said wall outside said opening, said spring member having a protuberance protruding into said opening and being in latching-pressure engagement with said recess means of said end when said end is inserted into said opening, and said end being in face-to-face abutting engagement with said sleeve member at the sleeve side remote from said wall and over the entire area of said sleeve side.

2. In a windshield-wiper attaching structure according to claim 1, said sleeve member and said leg member and wall consisting of an integral molded body, and said body having a molded junction with said leaf spring member irremovably fastening said spring member to said body.

References Cited in the file of this patent

UNITED STATES PATENTS

| | | |
|---|---|---|
| 1,573,618 | Laganke | Feb. 16, 1926 |
| 2,751,620 | Ehrlich | June 26, 1956 |

FOREIGN PATENTS

| | | |
|---|---|---|
| 1,023,025 | France | Dec. 24, 1952 |